3,300,424
PROCESS FOR THE PRODUCTION OF HARDENABLE PRODUCTS BY MULTIESTERIFICATION
Herbert Hoenel and Heinrich Lackner, Graz, Austria, assignors to Vianova Kunstharz Aktiengesellschaft, Vienna, Austria, a corporation of Austria
No Drawing. Filed Apr. 12, 1962, Ser. No. 187,133
Claims priority, application Austria, Apr. 12, 1961, A 2,930/61
11 Claims. (Cl. 260—21)

The additive reaction of maleic anhydride (in the following abbreviated with MA) by unsaturated compounds, as is known, takes place according to the diene synthesis or due to "substituting addition." Well known examples of unsaturated compounds are rosin, China-wood oil, oiticica oil, which due to conjugated double bonds, form so-called adducts. Maleinized oils however, are generallyy prepared from fatty oils having isolated double bonds in their fatty acid radicals, and these oils react in the other way. While derivatives of tetrahydrophthalic anhydride are formed in the one case, derivatives of succinic anhydride are formed in the other, thus in each case anhydrides of tricarboxylic acids, their partial glycerol esters respectively are formed. For both groups of resulting compounds the comprehensive term additive compound (AC) will be used in the following disclosure. Generally AC from rosin are esterified with polyols for technical use ("maleinate resins"), and also AC from fatty oils frequently are subjected to esterification for final use. As pointed out in the art, in this case only restricted proportions of MA can be used, and, if any, only glycols should be employed as esterifying agents, as otherwise a useless gelly mass will be obtained.

The present process, on the contrary, makes use of the fact that with suitably varied proportions, and furthermore with suitable choice of said olefinic MA compounding materials, infusible and insoluble final esterification products are easily brought about. The hardening process which is based on multiesterification is interrupted, and the reaction mixture is only employed in still soluble condition, while the final hardening is effected by an independent procedure.

Broadly stated, our process is a process for producing products, hardenable due to multiesterification, characterized in that a mixture is prepared from two components, which mixture comprises both a simple physical mixture and a partially mutually esterified but still soluble mixture, of (I) an AC prepared from 1 part by weight MA and about 3-6 parts by weight of olefinic compounds selected from the group consisting of unsaturated fatty acids, their natural and artificially prepared hydroxy free esters of glycerol and other polyols, including mixed esters thereof obtained from mere reesterifications and esters thereof alterated by saturated fatty acids, their glycerides respectively, rosin, and polycarboxlyic acids, thus in the single molecule of the AC, due to choosing said weight ratios between MA and its adding compound, and accompanying polymerization, altogether at least three esterifying groups (i.e. indirect and direct carboxy groups) being present, and (II) a polyhydroxy compound (PHC) having in its molecule at least two primary hydroxy groups, the ratio between I and II preferably, approximately at least, being determined by congruence of the total indirect and direct carboxy groups with hydroxy groups, which ratio only then may be altered substantially and the more, without loss of hardening capacity, the more the sum of functionalities of I and II surpasses five.

The above characterized mixture can be made insoluble in a separate step by exposure to elevated temperatures or by catalysts or by both measures. The hardening reaction is brought about either by solely progressive additive esterification of the anhydride groups present or of thus formed opened or otherwise present carboxy groups or due to both reactions.

As has been found, AC formed from MA and isolene fatty acids or their esters respectively such as olive oil, soya bean oil, tall oil fatty acids, or singly conjugated fatty acids and their esters, such as dehydrated castor oil (fatty acids), isomerized soya bean oil, etc., are esterified additively much faster with alcoholic compounds than is the case with an AC formed from MA and multiple conjugated fatty acids and their esters respectively, such as China-wood oil, oiticica oil, etc. Similarly this statement refers to carboxy groups being freed after the additive esterification. Rosin (its esters respectively) acts similarly to China-wood oil, although only singly conjugated double bonds are present. Reactive velocity, e.g. measured at 120° C., may be five to ten times higher in the first case than in the second case.

Furthermore we have found that particularly the additive esterification of the anhydride groups of an AC, especially that of the kind mentioned above, is extraordinarily accelerated by strong alkaline catalysts, particularly nitrogen bases, such as triethylamine and quarternary ammonium bases to bring about the additive esterification even at ordinary temperatures with a very pronounced formation of heat. Even traces of an alkali, earth alkali, zinc, lead, etc. soap frequently prove to be noticeably effective. By reasons which will be explained later, ammonia is of relatively little effect.

It has already been said above that for preparing the AC instead of natural also artificially prepared fatty esters or mixed esters my be used, such as glycerol or pentaerythritol esters or dehydrated castor oil, tall oil etc. Also indifferent mono- and/or polybasic carboxylic acids may be introduced into the esterlike compound, such as coconut oil and the like, adipic acid, phthalic acid, isophthalic acid, in other words, also oil modified alkyd resins may serve to form the AC. Generally materials rich in fatty acids, their esters respectively of the first mentioned groups are preferred. In any case however, care must be taken that such materials are practically free of hydroxy groups. Logically the hardening capacity of the compositions generally will be increased depending upon the number of both functional groups (carboxy and methylol) in the single molecule as well as measured per weight unit of the two components. Even when only one molecule of MA had been introduced into the compounding body, eventually a hardening capacity of the total composition can be achieved. This refers particularly to the case, if the MA compounding substance carries an additional carboxy group which in turn is also relatively easily esterifiable, i.e. in case of an olefinic acid. Its methyl ester react similarly since generally (as is known) such esters easily react with other alcohols with exchanged methanol set free. Moreover, the formation of AC in most cases is accompanied by a pronounced increased viscosity indicating to a considerable growth in molecular size. This phenomenon is far more probably caused by polymerisation, or copolymerisation, than by internal rearrangements due to reesterifications, as has been interpreted in the art. Thus, mostly an AC is formed having been equipped with a higher functionality of the single molecule than primarily expected. As will be shown below, a well operative AC of high functionality may be formed from even less than equimolecular proportions of MA.

In other words, it might be less decisive to employ a plurality of MA molecules per each molecule of the compounding substance than that the molecule and the weight unit respectively of the AC itself is rich in functional groups (anhydride and carboxy groups respectively).

Generally, oil glycerides may take up one molecule of MA per each acid radical without giving rise to gelation of the reaction mixture. In this case about 380 g. contain 1 g. anhydride group. This ratio will necessarily be reduced in case of moderately polymerized oils or alkyd resins which naturally should be of rather long oil length. In some cases this also refers to viscous fatty oils, what is particularly true of dehydrated castor oil and isomerized linseed oil. These oils can only be used in admixture, more exactly expressed, in internal mixtures (mixed esters) with other oils etc., if higher ratios, i.e. up to one mole MA per fatty acid radical, are to be reacted without gelation.

The fatty acid reacts quite similarly to dehydrated castor oil, at least when having a high content of conjugated double bonds. Despite the small molecule of the fatty acid, not even an equimolecular proportion of MA can be reacted without gelation. Nevertheless, a polymeric polyfunctional AC (equipped with several anhydride groups) is formed, as has been pointed out above.

Well adapted PHC which must contain at least two primary hydroxy groups in the molecule, for our process are: (a) well defined polyols, equipped with at least two primary hydroxy groups, such as glycols, glycerols, sorbitol, etc., polyols having a high number of primary hydroxy groups, such as trimethylol alkanes, certain conditions provided also (poly)pentaerythritol (see below), tetramethylol cyclohexanol, etc., (b) under certain circumstances also socalled active polymethylol compounds being as low molecular as possible, such as definable phenol polyalcohols, as well as their derivatives in which the phenolic hydroxy group is partially or entirely etherified, and still low molecular polymethylol compounds of urea, thiourea, melamine or other triazines; (c) besides these low molecular individuals also relatively high molecular even resinous bodies rich in hydroxy groups are well adapted, particularly such as pure or modified polyesters obtained from polycarboxylic acids and polyols used in excess, which polyesters, of course, carry a far greater number of (primary) hydroxy groups in its molecule as compared with polyols mentioned above; (d) under certain circumstances also phenol polyalcohols (resols) of a moderately increased molecular size may be used and socalled aminoplasts, viz. polymethylol compounds mentioned under (b) of moderately increased molecular size and partial etherification products thereof respectively provided they are prepared with sufficient care and with sparing an adequate number of their methylol groups; (e) finally also polyalkylol amines should be mentioned, especially triethanol amine which take the role both of a polyol and an alkaline catalyst, remaining in the mixture also at elevated temperature.

Since the hardening character of the mixture of the two components is caused by multiesterification, it can be understood that a maximum of hardening capacity mostly will be achieved when the total number of available methylol groups approaches that of carboxy groups. Deviations up to double equivalent proportions may eventually be advisable when employing those "active" methylol compounds enumerated under (b) and (d), since such compounds besides esterification are also capable of other reactions which, however, generally are brought about at more elevated temperatures than necessary for effecting those multiesterifications mainly responsible for the hardening process in our invention, where temperatures already above 140° C. mostly are sufficient.

Also in cases of steric hindrance which e.g. may concern PHC of class (c) a certain excess of stoichiometric ratios thereof may be advisable. Referring to AC on the other hand, less reactive anhydride groups etc. such as described above, may be neglected for choosing the most suited ratio, under certain circumstances.

Also the PHC average will be more effective the more functional groups it carries per weight unit or in its single molecule respectively.

If simply physical mixtures of AC and PHC are concerned, necessarily their solubility characteristics at least must be related, whereby the solvent being present (such as in varnishes) may play a mediating, bridging part. As solvents may be used hydrocarbons, ketones, ester- and etherlike hydroxyfree solvents; also tertiary alcohols, such as tertiary amyl alcohol, diacetone alcohol can be used without doing any harm, while certain care is necessary when using secondary alcohols, e.g. secondary butanol, isopropanol. The use of primary alcohols, however, is definitely excluded. If the solvent is not mediating miscibility, the mixture of components must be first subjected to a partial mutual homogenizing reaction. Of course, substances of a high melting point like pentaerythritol will be excluded from such mutual reactions. It will be shown below, however, that, certain conditions provided, even pentaerythritol may serve as PHC. By means of the catalytic method however, homogenizing the mixture due to partial additive esterification, can be achieved in an actually surprising way, even in extreme cases.

As already said, this additive esterification may be released even at ordinary temperature by the catalytic method, particularly with the aid of tertiary nitrogen bases. Thus it is also possible, suitable ratios provided, to effect the hardening even at ordinary temperature, and therefore we can prepare a cold setting socalled "two component varnish" by means of the present process. Since in this case each anhydride group exhibits only a single functionality, at least two anhydride groups must be present in the (eventually polymerized) molecule of the AC and for each anhydride group only one primary hydroxy group of the PHC should be available for attaining the maximum hardening effect, unless a relatively high molecular PHC, such as a polyester of high functionality is employed, which also in this case allows the use of an excess over stoichiometric proportions. For practical application of the process in this direction without loss of hardening effect the deviation from stoichiometric proportions may be the greater the richer the single molecules of the AC and PHC are in functional groups (i.e. anhydride and methylol groups respectively).

As has been pointed out already, the compositions of our invention may also serve as basis for varnishes and impregnating agents and adhesives (e.g. for the production of waterproof sanding papers and the like). It is of particular importance that our process may also be directed towards soaplike watery systems, whereby eventually water tolerable solvents may be coemployed. Also the use of saponified maleinized oils mentioned above with the addition of drier is described in the art for use in watery paints and varnishes. It has also been tried with completely insufficient success to diminish the great brittleness of phenol and aminoplast resins by the addition of small amounts of saponified maleinized oils.

Different ways are suited to combine the AC and PHC into a watery system, and the most suited way may depend upon the varying nature of the two components.

(a) According to one method the anhydride groups of the AC are first at least nearly fully saponified (opened) with the aid of a tertiary nitrogen base and water, whereupon the thus formed watery soap solution is simply mixed with the PHC which in this case naturally must be at least hydrophilic to a high extent, such as trimethylolethane or -propane. The water hereby plays said mediating part in the composition. Even pentaerythritol can be used in this manner, the quantity depending upon its solubility in water. A high molecular PHC, however (such as a polyester), ought to carry carboxy groups too by which saponification of the PHC is made possible. Also physical miscibility with the AC has to exist, at least to some extent.

Water soluble phenol alcohols (being a PHC) in this method are mainly restricted to those obtained from phenol itself. Their high reactivity, however, makes necessary a restricted choice of AC with a high content of MA in order to secure chemical compatibility, i.e. in order to achieve a clear homogenous stoved film. This also depends upon the nitrogen base used. Phenol alcohols from blocked phenols, also favourably distinguished by a long shelf life, it is true, are chemically compatible in every case, but they can only be used in restricted proportions on account of their poor water tolerance, unless they are carrying soap forming carboxy groups.

This method of combining allows also the use of fairly water tolerable aminoplasts mostly to some extent partially etherified with mono- or polyalcohols, preferably in conjunction with other PHC.

As far as nitrogen bases are concerned, only tertiary amines bring about a total opening of anhydride groups whilst ammonia and to a somewhat smaller extent also primary and secondary amines, as we have found, lead to the formation of amides (and substituted amides respectively) to a very appreciable extent and thus carboxy groups are lost for soap formation. Without previously opening the anhydride groups of an AC being poor of compounded MA, a sufficiently water soluble soap cannot be formed with ammonia at all. In other cases, as we have found, the viscosity of the watery solution is substantially lower than that of a soap being formed without such previous opening. Preferably this opening is realized by prolonged heating of the AC with water with the aid of a tertiary amine before adding the far cheaper ammonia. This preceding opening of the anhydride groups when forming a soap from other than tertiary nitrogen bases constitutes a part of our invention.

(b) According to another method we subject the PHC to a partial additive esterification with the AC at elevated temperature, whereupon only the watery soap of a partial ester is formed. The PHC must be sufficiently low melting and sufficiently heat resistant, and thus in this case e.g. only resols from blocked phenols can be used alone or in admixture with a minor proportion of resols derived from unblocked phenols. Also lower molecular polyester resins may be used in this method.

Due to a catalytically released multiesterification of anhydride groups still present in the PHC gelation may occur when using a tertiary amine for final saponification. Thus it might be necessary to heat the reaction mixture for some time with water before a tertiary amine is added. The addition of e.g. ammonia, however, is harmless.

(c) The catalytical method to link the AC with the PHC is of particular importance since the nitrogen base at the same time acts as saponification agent and thus can also be used in particularly effective large proportions. It is furthermore possible by means of this method to link a non water soluble PHC to the AC achieving its water solubility in a so to say mediating way. This is even true in cases where a linking according to the method described under (b) fails due to sensitivity to heat of the PHC or due to its extreme physical incompatibility with the AC. If the latter is derived from an oil fatty acid such mediating water solubility is particularly easily brought about on account of their additional soap-forming carboxy groups.

By means of this method it is on the other hand also possible to link an AC with a highly active polymethylol compound both of unblocked phenols and polyamides, such as bisphenol tetraalcohol and primarily obtained urea- and melamine-formaldehyde condensates, i.e. non etherified polymethylol compounds. Surprisingly such linked components also on stoving give an excellent elastic film which phenomenon might be explained in that due to the linkage a blocking alteration takes place adequate to usual partial etherification.

When exercising this method of linking the two components in which as a rule overcatalytical quantities of the base—generally tertiary amines—are used, a spontaneous gelation may occur due to multiesterifications. This may happen the easier, the richer the two components are of functional groups in the single molecule, and also the more reactive the methylol groups are, as is the case e.g. with phenol polyalcohols. Therefore it is mostly necessary to reduce the reactivity of the AC to a certain degree, i.e. to diminish the number of anhydride groups in the single molecule (which generally is larger than simply calculated) eventually to only one. This can be done either by means of an exactly chosen amount of water in the presence of a tertiary base, which upon prolonged action partly causes opening of the anhydride groups, or eventually also by an immediately acting definite amount of methanol. Although the methyl ester group formed thereby may take part in the hardening reaction, at least at somewhat intensified stoving conditions, the pretreatment with water is preferred. In some cases it is also sufficient to simply perform the catalytical linking in the presence of a large quantity of water to avoid gelation. But we prefer, if necessary, said systematic reduction of anhydride groups with a definite quantity of pretreating water.

One mole of a tertiary base per each anhydride group generally suffices to obtain a well dilutable soap. Strongly diluted it shows a slightly alkaline reaction due to hydrolysis (pH value about 8). A further addition is useless and the second carboxy group likely simply supports the hydrophilic character of the AC.

With ammonia, however, 1.4–1.6 moles per each anhydride group is necessary to bring about said weak alkaline reaction. About half of said quantity likely forms an amide, as said above, and only the other half may be determined titrimetrically. After preceding opening of the anhydride groups, in the way described above, also about up to 1.5 moles of base are to be added altogether, which in contradistinction to the direct saponification with ammonia fully may be determined titrimetrically. This fact, no doubt, is responsible for the far better water dilutability in the one case to which we have pointed above and which becomes the more noticeable, the less MA is tied in the AC. Similarly as ammonia behave primary and secondary amines.

Only when active methylol compounds (phenol alcohols, etc., aminoplasts) are employed as PHC, also the amide groups participate in mutual reaction with those methylol compounds, but in all other cases they are to be considered as lost. In this case, however, AC containing a high percentage of adducted MA are preferred.

Instead of employing isolated phenol polyalcohols prepared in the usual way with caustic alkali, and the like (which finally ought to be neutralized) in our process also directly obtained phenolates may be used, replacing the caustic soda simply by a tertiary amine or a quarternary ammonium base. In accordance with their general reactivity phenol polyalcohols are also particularly easily esterifiable in our process, and, provided no excess over stoichiometric proportions is employed, the hardening at temperatures below 160° C. quite likely is only due to multiesterification taking place. Surprisingly pale coloured films may be obtained.

As can be seen from the description the process may be directed in very different ways. The following examples mainly serve for illustration but are by no means restrictive for the process.

First we are describing the preparation of several AC which will be used in the examples below:

(AC)

(a) 900 g. linseed oil (roughly one mole) are heated with 200 g. MA (roughly two moles) with the exclusion of air gradually up to 220° C. and the mixture is kept at this temperature until practically all MA is tied. 1–2 hours are necessary. The molecular size of this AC is at least 1080 and it carries at least two anhydride groups in each molecule.

(b) A mixed ester is formed by heating 600 g. of a low viscous fairly completely dehydrated castor oil (165 cp.), 120 g. linseed oil, 180 g. French rosin, and 22 g. glycerol to finally 260° C. until the acid number has dropped to nearly 0. Vacuum or azeotropic means may be employed hereby, and reesterification and esterification may also be supported by a catalytical amount of alkali, calcium, zinc, or lead soap. After cooling to 180° C. 200 g. MA are added and reacted in the same way as with AC (a). The yield is 1100 g. which roughly corresponds to the minimum molecular size and to two anhydride groups in the molecule. Its actual size is very probably considerably higher.

(c) 350 parts of linseed oil or soya bean oil, or of a pale sardine oil (iodine number above 180) or of the mixed ester prepared according to AC (b) are treated with 100 parts of MA, working in the same way as described in AC (a). Since the molecular size of this AC is at least 1130, at least 2.57 anhydride groups are present in each molecule.

(d) 1150 g. of distilled tall oil (acid number 185, rosin content about 23%) are fully esterified with 140 g. of a technical pure pentaerythritol at temperatures up to 265° C. The mixed ester formed is treated with 300 g. MA until the latter is fully tied. The AC has a minimum molecular weight of 1500 and contains at least three anhydride groups per molecule.

(e) A mixed polyester is formed from 400 g. (isomerized) soya bean oil, 100 g. coconut oil, 100 g. phthalic anhydride and 70 g. hexantriol (byproduct of the Buna butadiene manufacture, purity 90% roughly). Esterification is driven to an acid number below 20. In order to avoid decomposition of this polyol temperature must not surpass 220° C. Azeotropic means is suitable. The alkyd resin is treated with 150 g. MA similarly as described in AC (a). This AC has a minimum molecular size of 1600, and at least three anhydride groups are present in the molecule.

(f) From 3 parts linseed oil or isomerized soya bean oil and 1 part MA (all parts given being parts by weight) an AC is prepared in analogous way to AC (a). The viscous product very probably is of far greater molecular weight than when simply adding one mole oil to three moles MA (=1200). Very probably in each molecule up to five anhydride groups are present.

(g) From 280 g. tall oil fatty acid (roughly one mole) and 100 g. MA a dark brown relatively low viscous AC is formed after heating the mixture for 10–12 hours at 190° C. In each 380 g. one g. anhydride group and one open carboxy group is present.

(h) 400 g. of distilled dehydrated castor oil fatty acid (rich in conjugated double bonds, make DEDICO) and 100 g. MA quickly form an AC after heating to 190° C. for only about two hours. The AC is distinguished by extreme paleness, and its viscosity indicates an actual molecular size of about 1500. Although even less than the mole ratio of MA has been used, the AC carries about three anhydride groups in the molecule.

Besides well defined chemical individuals, like polyols, the following PHC will be used in the examples below:

(PHC)

(a) A polyester is formed by first interacting 300 parts linseed oil with 100 parts of pentaerythritol with the aid of KOH until a monoester is formed. Thereupon further 200 parts of pentaerythritol and 300 parts of phthalic anhydride are added. Esterification is terminated when the acid number has dropped to 35–40. Per each 170–175 g. of this polyester resin 1 g. hydroxy group is present. It is dilutable in aromatic hydrocarbons, alcoholic or esterlike solvents and, despite its low acid number, in watery ammonia or other nitrogen bases.

(b) In well known manner with the aid of caustic alkali a low molecular liquid mixture of phenol dialcohols is formed from each one mole (150 g.) para-tertiary butyl phenol and para-tertiary octyl phenol (206 g. called para diisobutylphenol) and 350 g. formaldehyde, 37% (by weight), and diluted with ordinary mineral spirit and liberated from water. The solution in mineral spirit is dred by adequate means and brought to a total weight of 600 g. This 80% solution has a solid content of 476 g.

(c) A clear solution is formed from 108 g. tricresol (metacresol content about 35%, 1 mole) and 150 g. methanol free formaldehyde, 44% (by weight), 54 g. isopropanol, and 12 g. triethylamine. After about one week the formaldehyde is nearly fully tied and the phenol polyalcohol mixture mainly contains dialcohols. Solid yield about 165–170 g. In roughly 300 g. of said solution two methylol groups are available.

(d) According to known methods a soft resin is formed from 1 mole melamine (126 g.), 6 moles formaldehyde, 8 moles isopropylglycol, in which resin the primarily formed methylol groups are partly etherified. It is soluble in alcohols as well as in aromatic hydrocarbons but insoluble in water. The process is terminated when the solid content has reached at least 510 g.

In the presence of 170 g. of a high boiling non alcoholic but sufficiently hydrophilic solvent (e.g. diethylene glycol diethylether) or also of diacetone alcohol the isopropylglycol which did not enter reaction is entirely removed from the resin by distillation under vacuum. 680 g. of a 75% solution are obtained.

Since not all of the formaldehyde used enters into reaction it is supposed that the single molecule of the melamine resin carries only two non etherified methylol groups.

(e) A modified melamine formaldehyde condensate is formed according to known methods from 1 mole melamine, 6 moles formaldehyde, 2 moles trimethylolpropane and 4 moles n-butanol. Under finally slightly acidic conditions and azeotropic means the condensation is conducted until 550 g. of nonvolatile matter are formed. Afterwards the butanol which did not enter into reaction is driven off by means of vacuum or in the presence of a high boiling water tolerable, indifferent solvent, such as diacetone alcohol or diethylene glycol diethyl ether, and is further dissolved with the same solvent to 880 g.

It is believed that about 1 mole of the butanol has entered into reaction due to etherification and also the trimethylol propane has mainly done so, since it cannot be extracted from the solution of the condensate in a non water miscible solvent. The product itself is only dilutable very poorly with water. About 6–7 hydroxy groups will be present in each original mole of melamine.

(f) A nearly neutral polyester resin is formed from 3 moles isophthalic acid, 1 mole trimethylolpropane and 3 moles pentaerythritol. This resin has probably a molecular size of at least 940, and 9 hydroxy groups are present in the molecule.

(g) A polyester resin with an acid number of 65–70 is prepared by first fully esterifying each 1 mole of adipic and isophthalic acid with 4 moles pentaerythritol, whereupon 1 mole trimellitic anhydride is added. The esterification is continued until said acid number is attained. The resin is readily soluble in the calculated quantity of watery ammonia or another nitrogen base. It has a hydroxy equivalent number of about 95.

(h) A polyester resin is prepared in the following way: 100 parts of MA are reacted with 500 parts of China wood oil at temperatures up to 170° C., whereupon 200 parts of pentaerythritol are added. The reaction mixture is kept with constant stirring at 200° C. until the acid number has dropped to about 45. In order to favourize hydrolysis (reesterification) catalytical quantities of a calcium-, zinc- or lead-soap may be added. Per each about 165 g. of the resin one gram hydroxy group is present. Despite the low acid number it can be diluted in watery ammonia or other strong nitrogen bases.

(i) 70 g. water, 50 g. paraformaldehyde, 95%, 30 g. trimethylolethane and 35 g. melamine are kept with stirring under moderate alkaline conditions (pH value about 9) until the content of free formaldehyde has dropped to 6% or less. 8–12 hours are necessary. Since practically no etherification will take place substantially a physical mixture of two PHC will be present.

Trimethylolethane may be replaced by an equivalent quantity of another easily water soluble polyol with primary hydroxy groups, partly also by pentaerythritol, or it may be replaced e.g. by a polyester resin rich in hydroxy groups, such as described under PHC (g) which is rendered into watery solution by means of an indifferent nitrogen base.

*Examples*

(1) 108 g. of AC (a) are diluted in a mixture of each 40 g. mineral spirit and xylol and the solution obtained is thoroughly mixed with a solution of 70 g. PHC (a) in 40 g. xylol. This mixture corresponds to two hydroxy groups per each anhydride group. If not immediately clear it will become so after a short storage. This varnish well serves to impregnate electrical coils since it is easily stoved to a tough gelatinous mass within a few hours at 120° C.

The slight turbidity of the mixture is immediately removed after addition of a catalytical quantity of caustic soda or, more suitable, a tertiary amine. Such additions considerably accelerate the gelation on stoving.

The AC (a) may be replaced without changing the proportions, by AC (b). The finally obtained gelly mass is distinguished by superior hardness over that obtained from the other mixture.

(2) A 50% solution is prepared from 108 g. AC (a) or AC (b) in a mixture of ⅔ of mineral spirit and ⅓ of xylol, whereupon 60 g. of PHC (b) (80% solution of phenol dialcohols) are admixed. This varnish may serve e.g. for the same purpose as that according to Example 1 and is distinguished by a considerably superior stoving ability.

(3) By replacing 108 g. of AC (a) or (b) as used in Example 2 by 88 g. of AC (c) or only 80 g. of AC (f), mainly using xylol as a solvent, the toughness and chemical resistance of the stoved film or impregnating mass respectively is still further improved.

(4) The solution of 88 g. AC (c) or of 80 g. AC (f) is mixed with only 30 g. instead of 60 g. of the solution of PHC (b), and is further diluted mainly with xylol to a solid content of 40%. In this mixture for each anhydride group only one hydroxy group is available. Shortly before its application 1 g. triethylamine is thoroughly admixed. An application of this varnish is absolutely dustfree already after about ½ hour and becomes a tough tackfree film overnight. Toughness and hardness may be improved by a drier. Suitably the catalyst is added to the solution of PHC (b) before its admixture to the other solution. This method fully corresponds to the so-called two component cold setting varnishes which ought to be used shortly after mixing the two components.

(5) 450 g. of the rosin modified AC (c) (obtained from 350 g. of the mixed ester as described under AC (b) and 100 g. MA; roughly one mole) are heated to 105° C. with 90 g. trimethylol propane (⅔ mole) until the reaction mixture becomes clear also in the cold, due to partial additive esterification. If catalysts had been used for preparing the mixed ester as mentioned under AC (b), clearness is attained easily even below 100° C. Now the reaction mass is chilled by the addition of 200 g. of water and 100 g. of secondary butanol, and upon addition of 90 g. triethyl amine or another indifferent water tolerable nitrogen base a soap is formed.

The watery soap is further diluted with 600 g. of water. Particularly after adding a water soluble drier an application of this solution stoved at 140° C. or above gives a film with considerable toughness.

(6) 25 g. of pentaerythritol are dissolved in 150 g. hot water. Upon addition of 200 g. of the rosin modified AC (c) the temperature is brought again to about 80° C. With vigorous stirring now a mixture of 10 g. triethanol amine, 40 g. triethyl amine and 45 g. secondary butanol is slowly added. Due to exothermic reaction the mixture starts boiling. A soap with about 50% solid content is obtained which can be further diluted with water to any desired extent. An application of a suitably diluted mass forms a clear film and stoves with considerably more hardness than that obtained according to the preceding example.

The 40 g. triethyl amine may be replaced by an equivalent amount of watery trimethyl amine or another tertiary amine, and the pentaerythritol e.g. by dipentaerythritol.

Triethyl amine may be replaced by other indifferent water soluble amines. Particularly adapted are monoalkanol amines with secondary hydroxy groups, since the watery solutions are less viscous and also clear at elevated temperatures.

(7) 540 g. of AC (b) (derived from 1 mole MA) are dissolved in 108 g. ethyl glycol acetate or diacetone alcohol. 310 g. water and 80 g. triethyl amine are added with vigorous stirring, which causes a noticeable exothermic temperature rise. Only after the addition of 300 g. of PHC (c) and further 50 g. secondary butanol almost immediately a pale clear solution is formed, with about 50% solid content, and which can be further diluted with water to any desired extent. An application when stoved at 140° C. or above gives a nearly colourless extremely hard and elastic coat of extreme water resistance.

A part of the PHC (c) may be replaced by an equivalent (i.e. having an equal number of methylol groups) amount of trimethylol propane. It is also possible to replace e.g. ⅓ of the PHC (c) by 25 g. triethanol amine (equivalent to ½ hydroxy group), at the same time reducing the triethyl amine by 17 g. (⅙ mole). In this case the triethyl amine may also be replaced by triethanol amine when preparing the PHC (c) solution.

(8) 270 g. of AC (b) are saponified in analogous way as in the preceding example in the presence of a water tolerable organic solvent and a large quantity of water with only ½ mole triethyl amine (50 g.). The solution is brought to a total weight of 800 g. On the other hand a triethyl amine soap solution is formed from 175 g. of the polyester PHC (a). This solution is brought to a final weight of 500 g. A mixture of the two solutions has a solid content of about 35% and its application when stoved at 140° C. gives a film of remarkable hardness. A substantial deviation from the proportions which correspond to stoichiometric ones, diminishes the hardness of the film. It might, however, be improved by adding e.g. 40 g. of a water soluble aminoplast prepared according to known methods from 1 mole melamine, 6 moles formaldehyde and 8 moles methanol.

(9) 270 g. of AC (b) are saponified by means of 0.8 mole ammonia instead of 0.5 mole triethyl amine. The soap is diluted to the same extent as in Example 8. By titration it can be seen that only about 0.5 mole of the ammonia are actually forming a soap, and thus also a correspondingly reduced number of carboxy groups is available.

From the polyester PHC (a) also an ammonium soap is formed and diluted like in Example 8. It becomes fairly evident that only about 300 g. of this solution should be employed in order to attain an optimum of film hardness of the mixture with the AC solution. Logically the hardness is diminished and it is suitable to add the melamine resin mentioned in the preceding example. The mutual reaction between this resin and the amide containing AC solution is improved, and the same final film hardness is again achieved as according to Example 8.

The achievable hardness can also be increased when using an AC which contains more MA in the single molecule, such as AC (c), AC (d), AC (e) and AC (f).

(10) 440 g. of the rosin modified AC (c) are dissolved in 44 g. ethylglycol acetate or diacetone alcohol, whereupon 175 g. of PHC (d) (derived from ¼ mole melamine) and 2 g. triethyl amine are added. The mixture is heated for 15 minutes at 70° C. Then 50 g. of diethylene glycol are added and the heating is continued for further 15 minutes at said temperature. Now the mixture is chilled with 300 g. of water, followed by a mixture of 90 g. isopropanol and 75 g. triethyl amine; finally further 150 g. of water and 25 g. of triethanol amine are added. The watery solution has a solid content of about 50% and can be further diluted with water to any desired extent.

An application of e.g. a 32% solution stoves at temperatures above 130° C. quickly forming a film of remarkable hardness.

(11)) 440 g. of the AC (c) used in Example 10 are likewise dissolved, then 220 g. of isopropanol and 18 g. of methanol are admixed, and 220 g. of the solution prepared according to PHC (e) (derived from ¼ mole of melamine) and 90 g. water. With vigorous stirring a mixture of 100 g. triethyl amine, 35 g. isopropanol and 200 g. water is added. To the quickly formed watery solution 35 g. butyl glycol are added. The thus obtained about 50% watery solution can be further diluted with water to any desired extent. A varnish application stoves with great hardness and considerably high elasticity.

(12) (a) 108 g. AC (a) derived from 0.2 mole MA are directly saponified with 150 cc. of a 2 N solution of ammonia under heat. A clear 33% solution can only be achieved when about 20 g. secondary butanol or a similar solvent are added.

(b) The quantity of AC mentioned above is first treated with about 100 g. water and 2 g. triethyl amine for 1-2 hours at boiling temperature and with stirring. Then only an adequately concentrated quantity of ammonia is added, equal to that used in (a), however diminished by 0.02 mole, and corresponding to the triethyl amine used. The soap is also diluted to a solid content of 33%, however, without the addition of secondary butanol.

Although solvents like butanol generally greatly reduce the viscosity of watery resin soap solutions, the solution prepared according to (a) is about 2½-3 times as viscous as that prepared according to (b) (K and D respectively, Gardner-Holdt tubes).

Also combinations with a PHC participate in this advantageous different behaviour, e.g. a mixture with a phenol alcohol solution prepared in known manner e.g. from 15 g. of para tertiary butyl phenol, 10 g. bisphenol and 40 g. formaldehyde (30%).

When titrating against methyl orange ⅒ of the solution under (a) needs only 17-18 cc.

(14) 38 g. of the AC (g) are thoroughly mixed with 10 g. diacetone alcohol and 20 g. triethyl amine. Upon addition of 45 g. PHC (d) a considerable exothermic rise of the reaction mass may be observed. Already after a few minutes it becomes dilutable with water, although the melamine resin used is almost entirely insoluble in water. Now e.g. 5 g. of liquefied trimethylol propane are added in order to bring about a proper equilibrium between the available carboxy and methylol groups. On stoving an application of the solution the film shows considerable brittleness, and it is suitable to add soap solutions prepared from AC (g) or another AC and a corresponding amount of polyol.

(15) Whilst it is by no means possible to compound the PHC (f) with the AC (g) homogeneously under heat, it is easily possible by catalytic means. 38 g. of said AC are stirred with 20 g. triethyl amine, whereupon a solution of 38 g. PHC (f) in a mixture of 15 g. diacetone alcohol and 10 g. water is added. Almost without thickening the reaction mixture becomes homogeneous almost immediately and infinitely dilutable with water, although the PHC is nearly insoluble in water. An application when stoved at about 160° C. forms a very hard elastic film.

(16) It is also impossible to combine the acidic polyester resin PHC (g) with an AC by simply applying heat, even if the latter is particularly rich in functional groups, as is the case with AC (g) or AC (h). A catalytical linking, however, is easily possible in the following way:

50 g. of the AC (h) are dissolved in 20 g. diacetone alcohol whereupon 20 g. triethyl amine and 1.2 g. water are thoroughly admixed. The mixture is kept at 50° C. for 15 minutes, whereupon a prepared 50% solution of 35-40 g. PHC (g) in the calculated amount of watery triethyl amine are added. The reaction mixture becomes pale almost immediately and homogenous, and may be diluted with water to unlimited extent.

The film obtained by stoving an application at about 160° C. is extremely hard and pale. If the weakening action caused by 1.2 g. water is omitted, gelation of the reaction mixture will occur.

(17) 400 g. of AC (f) are saponified in analogous way to Example 12 and (b) with the aid of 8 g. triethyl amine and 24 g. ammonia (waterfree substance!). This soap is diluted with water to a total weight of 1400 g. This solution is mixed with 600 g. of an ammonium soap solution prepared from 200 g. of PHC (h) and a dialcohol obtained acccording to known methods from 60 g. para tertiary butyl phenol. Upon addition of further 250 g. water a 30% watery lacquer is obtained which is considerably lower viscous and stoves definitely harder than when directly saponifying the AC (f) with ammonia (25.5 g., 100% concentration).

(18) A solution of 400 g. of AC (f) prepared from isomerized soy bean oil or of 450 g. of the rosin modified AC (c) or of 550 g. AC (b) in each 150 g. diacetone alcohol is mixed with 100 g. triethyl amine. In order to reduce the reactivity there are also added 12 g. respectively, 9 g. respectively, 6 g. of water, and the mixture is heated to 40° C. After 20 minutes the PHC (i) is added and the mixture is kept for about further 15 minutes at 50-60° C. The bleaching effect in the brown mixture indicates the termination of the linking. Applications e.g. of a 35% watery solution after drying form a perfectly clear film also when stoved at about 140° C. whereby a smooth, highly elastic coat is formed. Particularly when using the first mentioned PHC the coat is distinguished by an extreme hardness.

With these examples we wish to illustrate our process only; they are, however, not intended to limit our invention thereto.

The ratios between the two components AC and PHC are generally chosen according to stoichiometric conditions in the sense as explained in the description. Deviations from these ratios up to 20% in either direction scarcely affect the properties of the products obtained. In some cases even deviations up to doubling and down to having these ratios at least do not deprive the mixture of its hardening capacity, and are allowable with this respect, unless other aspects, such as proper water dilutability, are questioned by such far going alterations.

What we claim is:

1. A process for producing a coating composition hardenable due to polyesterification in which process a mixture is prepared, which comprises both a simple physical mixture and a partially mutually esterified mixture which is still soluble, of (I) an additive compound prepared by substantially complete reaction of 1 part by weight of maleic anhydride with from about 3-6 parts by weight of an olefinic compound selected from the group consisting of (a) unsaturated oil fatty acids having isolated double bonds, (b) unsaturated oil fatty acids having up to two conjugated double bonds, (c) hydroxy-free polyol esters of (a) and (b), (d) natural and artificially prepared esters of (a), (b), and (c) modified with (1) saturated fatty acids, (2) glycerides of saturated fatty acids, (3)

rosin or (4) polycarboxylic acids, and (II) a polyhydric compound having at least two primary hydroxy groups, the number of ester-forming groups in (I), comprising anhydride and carboxy groups, being substantially equal to the number of ester-forming groups in (II), and (III) a solvent being added.

2. A process according to claim 1, wherein the additive compound is prepared from 1 part by weight of maleic anhydride and from 3–4, 5 parts by weight of the olefinic compound.

3. A process according to claim 1, wherein the solvent is water and a saponifying water tolerable nitrogen base is co-employed.

4. A process according to claim 1, wherein water and a water tolerable tertiary amine as saponifying agent are co-employed.

5. A process according to claim 1, wherein the anhydride groups of (I) are first hydrolyzed by prolonged heating with water and then saponified with a water tolerable nitrogen base.

6. A process according to claim 1, wherein the opening of the anhydride groups is catalyzed with a tertiary amine and ammonia is used as the soap-forming agent.

7. A process according to claim 1, wherein component (II) contains an active polymethylol compound derived from a substance which is a member of the group consisting of phenols, urea, thiourea and triazines, and which process includes the formation of an aqueous solution by co-employing water and a saponifying water tolerable nitrogen base.

8. A process according to claim 1, wherein component (II) contains a polyester rich in primary hydroxy groups and which process includes the formation of an aqueous solution by co-employing water and a saponifying water tolerable nitrogen base.

9. A process according to claim 1, wherein component (II) contains a polyalkanol amine and which process includes the formation of an aqueous solution by co-employing water and a saponifying water tolerable nitrogen base.

10. A coating composition hardenable due to polyesterification which contains a mixture comprising both a simple physical mixture and a partially mutually esterified mixture of (I) an additive compound prepared by substantially complete reaction of 1 part by weight of maleic anhydride with from about 3–6 parts by weight of an olefinic compound selected from the group consisting of (a) unsaturated oil fatty acids having isolated double bonds, (b) unsaturated oil fatty acids having up to two conjugated double bonds, (c) hydroxy-free polyol esters of (a) and (b), (d) natural and artificially prepared esters of (a), (b) and (c) modified with (1) saturated fatty acids, (2) glycerides of saturated fatty acids, (3) rosin or (4) polycarboxylic acids, and (II) a polyhydric compound carrying at least two primary hydroxy groups, the number of ester-forming groups in (I), comprising anhydride and carboxy groups, being substantially equal to the number of ester-forming groups in (II), and (III) a solvent.

11. A coating composition according to claim 10, wherein component (I) is saponified with a water tolerable nitrogen base and which contains water as a solvent.

References Cited by the Examiner

UNITED STATES PATENTS

| | | | |
|---|---|---|---|
| 2,033,132 | 3/1936 | Ellis | 260—404.8 |
| 2,188,883 | 1/1940 | Clocker | 260—404.8 |
| 2,188,888 | 1/1940 | Clocker | 260—404.8 |
| 2,306,281 | 12/1942 | Rust | 260—404.8 |
| 2,312,732 | 3/1943 | Salathiel | 260—404.8 |
| 2,444,328 | 6/1948 | Blair | 260—404.8 |
| 2,909,496 | 10/1959 | Cooke et al. | 260—22 |
| 2,941,968 | 6/1960 | McKenna | 260—23 |
| 3,012,485 | 12/1961 | Bradley | 260—18 |
| 3,141,897 | 7/1964 | Crecelius et al. | 260—404.8 |

FOREIGN PATENTS

| | | |
|---|---|---|
| 120,697 | 12/1945 | Australia. |
| 500,348 | 2/1939 | Great Britain. |

LEON J. BERCOVITZ, *Primary Examiner.*

R. W. GRIFFIN, *Assistant Examiner.*